Patented Sept. 14, 1954

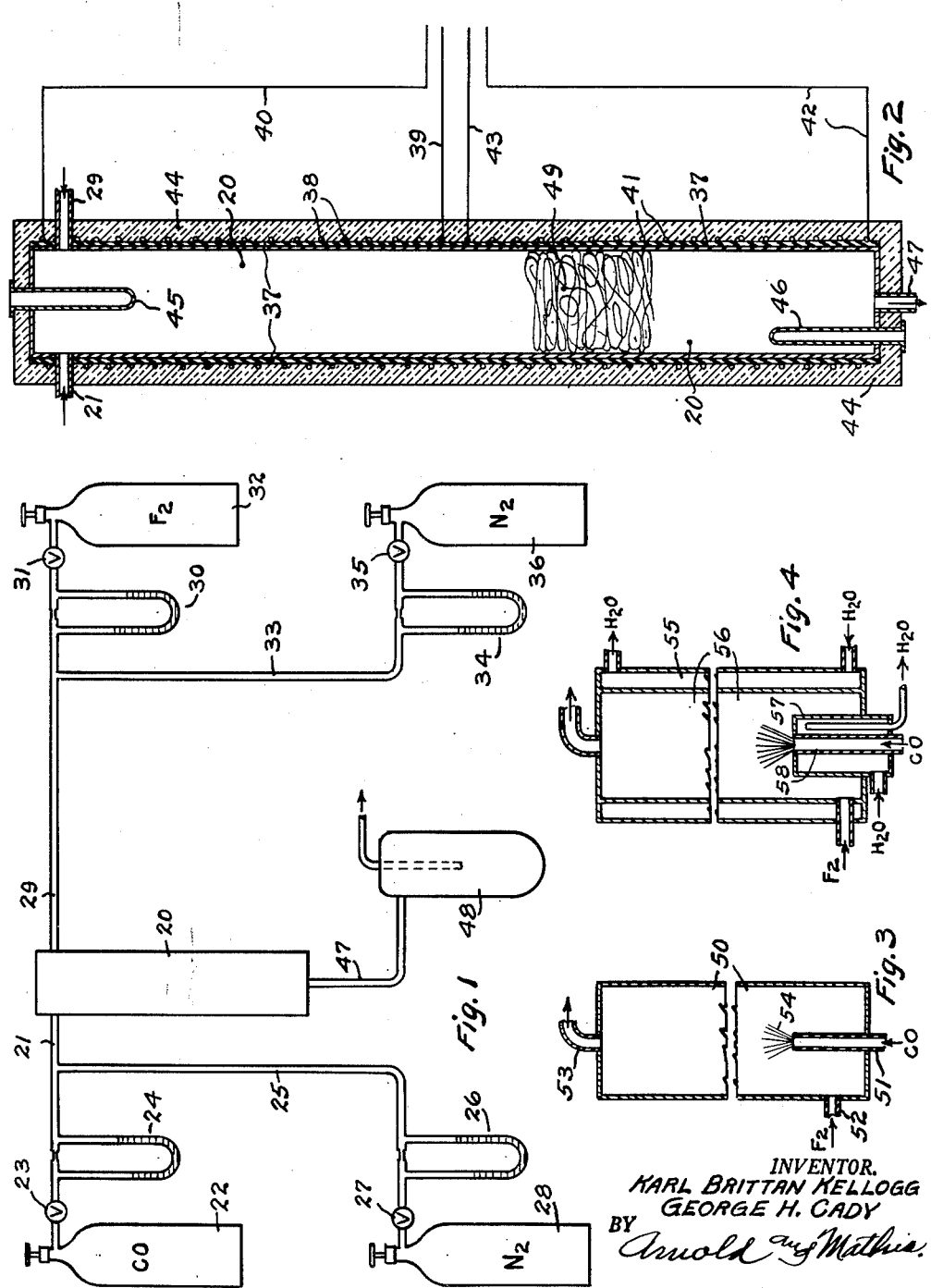

2,689,254

UNITED STATES PATENT OFFICE 2,689,254

PROCESS OF PREPARING THE COMPOUND TRIFLUOROMETHYL HYPOFLUORITE

George H. Cady and Karl Brittan Kellogg, Seattle, Wash.

Application November 23, 1949, Serial No. 129,076

26 Claims. (Cl. 260—453)

Our invention relates to the process of producing trifluoromethyl hypofluorite.

For many years, chemists have sought methods for preparing compounds of the type ROF in which a fluorine atom is linked to an oxygen atom where R is an atom or a radical. Like their chlorine analogs such substances are useful because of their toxicity and their high chemical reactivity. Also, such compounds are useful as starting materials to form other compounds.

In the past only a few such compounds containing fluorine have been produced, such as oxygen fluoride ($OF_2$), fluorine nitrate ($FNO_3$), and fluorine perchlorate ($FClO_4$) which contain an O—F group. The latter two compounds are dangerous to use because they are highly explosive.

We have found that trifluoromethyl hypofluorite ($CF_3OF$) can be produced in high yield by the action of fluorine upon a variety of carbon compounds having a molecular structure in which an oxygen atom is directly linked to a carbon atom. As an outstanding exemplification of our discovery and to point out a specific compound at this point, we have found, among others, that carbon monoxide is particularly efficient in providing a high yield of trifluoromethyl hypofluorite. By employing carbon monoxide to react with fluorine, the reaction is characterized by the small amount of fluorine consumed. We have found if the carbon atom is also additionally linked with other carbon atoms or other atoms other than the fluorine, then these bonds will be broken and the formation of trifluoromethyl hypofluorite will result.

The term "reacting" is used herein to connote the chemical change with or without a flame, the change occurring either in or not in the presence of a catalyst. "Burning" is used to connote reacting with the formation of a flame with or without a catalyst. "Directly reacting" is used to connote that the reaction took place in the absence of an added catalyst.

Among the possible uses for the compound produced by our method are the following: The compound itself may be employed as a toxic gas to kill insects or other living things or other animal life. The compound itself may be used as an oxidizing agent to support the combustion of fuels in engines. The compound may be used: (a) as a reagent to be combined with unsaturated organic substances to form other substances containing fluorine; (b) as a reagent to replace hydrogen atoms in organic molecules with radicals of high fluorine content; and (c) as a fluorinating agent to be used in the production of lubricants, resins and so forth of high fluorine content.

In connection with forming trifluoromethyl hypofluorite from carbon monoxide and fluorine, we have discovered that the preparation may be either with or without a so-called catalyst. We find that under certain conditions it is advantageous to employ inert diluent gas in connection with the substances to be reacted upon in the production of the product trifluoromethyl hypofluorite but may be omitted. These inert diluent gases may be nitrogen, argon, helium, and hydrogen fluoride. We have discovered that under certain conditions it is advantageous to employ a heat resistant porous mass which may operate as or after the manner of a catalyst or as a device which prevents explosions of the reacting gases. The bringing together of the gases fluorine and carbon monoxide develops a reaction heat of such intensity that care must be used to prevent the ignition of the apparatus. By having the reaction of the gases take place in the presence of the porous mass, said porous mass functions to distribute the reaction over a large volume in contrast to a localized volume, and also to withdraw the heat from the zone of reaction.

The degree of diluting with the inert gas is not a critical feature. According to our experience, substantially equal volumes give satisfactory results. It functions as a method of controlling the heat liberated by the reaction. The diluent may be omitted entirely.

The apparatus employed is illustrated in the following drawings, throughout which drawings like reference numerals indicate like parts:

Figure 1 is a schematic view of the arrangement of the apparatus used in one process herein set forth of producing trifluoromethyl hypofluorite;

Fig. 2 is a view in vertical section of the reaction chamber or vessel;

Fig. 3 is a view in vertical section of the reaction chamber of the apparatus used in another process herein set forth of producing trifluoromethyl hypofluorite; and Fig. 4 is a view in vertical section of a modified form of the reaction chamber of Fig. 3.

For purpose of clearness and definiteness of disclosure, the apparatus is set forth wherein the compound employed is carbon monoxide. The reaction vessel or chamber 20 has inlet conduit 21 for the admission of carbon monoxide from the supply cylinder 22 with its control valve 23 and flow meter 24. If a diluent such as nitrogen is employed, it may be introduced and intermixed with the carbon monoxide through conduit 25 with its flow meter 26 and control valve 27 from nitrogen supply cylinder 28.

Similar connections are provided for the admission of fluorine ($F_2$) to the reaction chamber 20 which also has inlet conduit 29 having flow meter 30 and control valve 31 communicating with supply cylinder 32. If a diluent gas, as nitrogen, is employed, it may be introduced and intermixed with the fluorine through conduit 33 with its flow meter 34 and control valve 35 from supply cylinder 36.

Reactor chamber 20 may be constructed with a temperature control or heating mechanism comprising an electrical insulation covering 37 for the chamber or vessel 20 insulating the heating means of Nichrome ribbon 38 having lead wires 39 and 40 for the upper portion of the chamber 20 and Nichrome ribbon 41 with lead wires 42 and 43 for the lower portion of the chamber 20. A heat insulation coating 44 is preferably provided for the vessel 20 as well as temperature wells 45 and 46.

Outlet conduit 47 for the products produced by the reaction extends to trap 48 which may be cooled by being immersed in liquid oxygen. To remove any hydrogen fluoride present the products being removed by outlet conduit 47 may be treated according to common practice to a sodium fluoride trap before the gaseous products reach the trap 48.

A catalyst comprising a ribbon 49 of copper coated with silver may be employed in vessel 20. The catalyst is prepared for use by exposing it to fluorine which converts the silver to fluorides of silver.

The reaction vessel 20 consists of a copper tube 7.5 cm. inside diameter and 90 cm. length. It may be packed tightly with 4500 g. of copper ribbon functioning as a catalyst 49 of 0.035 cm. width and 0.008 cm. thickness having a total surface area of 150,000 sq. cm. In the preparation of the catalyst 100 g. of silver is preferably deposited on the surface of the ribbon by displacement from a solution containing $Ag(CN)_2$ ion. Fluorine gas is later used to convert the silver to the difluoride. The reaction vessel is built in such a way that its temperature can be controlled by regulating the flow of electricity through two separate sections of Nichrome ribbon 38 and 41 used for electrical heating. When the system is in operation, a temperature between 160 and 180 degrees C. is maintained. This system may be used at temperatures up to the ignition point of copper in fluorine (well above 300 degrees C.) and down to the temperature which is maintained by the heat of reaction of the materials. The size of the equipment and the nature of the catalyst are not critical excepting for these qualifications: It is necessary to use a reaction vessel of sufficient size to permit the heat of the reaction to be dissipated at temperature lower than the ignition point of the catalyst. Only small free spaces should be left between different portions of the catalyst in order that violent explosions within the reacting gases may be prevented. When a compound in which hydrogen atoms are attached to carbon atoms is being fluorinated, the temperature of the catalyst should be at about 125 degrees C. or higher to prevent the formation of a polymer of tar-like character when the catalyst loses its activity. The catalyst should be characterized by high heat conductivity and heat capacity so as to prevent the formation of overheated localized zones during the reacting of the fluorine.

It has been found that fluorinating agents, such as silver difluoride and cobalt trifluoride, when used alone fail to produce the trifluoromethyl hypofluorite with compounds containing carbon linked directly to oxygen. The direct action of fluorine is required.

For directly reacting fluorine with a carbon compound having an atom of carbon directly linked to an oxygen atom, a reaction vessel 50, Fig. 3, having the carbon compound, as for example carbon monoxide, inlet conduit 51 in its lower portion, and likewise a fluorine conduit 52 in the lower portion and lead off product conduit 53 may be employed. The position of the inlet conduits 51 and 52 may be located in the upper portion of the reaction vessel. The material used in the construction of the reaction vessel 50 and the conduits 51 and 52 should be resistant to attack by fluorine and the material may be, for example, copper or nickel.

The rate of production preferably may be increased by employing a heat transfer mechanism 55 (as a common water jacket) about the reaction vessel 56, Fig. 4, particularly about that portion of the reaction vessel where reaction is initially taking place. Also, preferably a heat transfer mechanism 57 (as a water jacket) may be provided for the carbon monoxide inlet tube 58.

Of course, if desired, a diluent may be employed alone as a means in controlling, or as a cooperating controlling means, of the reaction.

Methods of production

1. Fluorine, flowing at a rate of about ten liters per hour was mixed with nitrogen flowing at six liters per hour and the mixture was passed into the reaction vessel near one end. Carbon monoxide was mixed with one-and-a-half times its volume of nitrogen and the mixture was passed into the reaction vessel at a rate of five liters per hour. The function of nitrogen was to lessen the intensity of the reaction. The nitrogen prevents the localization of the reaction and thereby reduces the chance that the temperature may reach a degree where the catalyst might ignite in the fluorine. The two streams of gas entered from opposite sides of the cylindrical reactor. Gaseous products together with unreacted fluorine and nitrogen left the reactor through an outlet located at the end remote from the inlets. This mixture of gases passed through a condenser cooled by liquid oxygen. From the mixture of substances collected in the condenser, trifluoromethyl hypofluorite was separated by fractional distillation. Its volume, when in the gaseous state, was approximately seven tenths as great as the volume of carbon monoxide used in its production.

It has long been known that carbon monoxide (CO) plus fluorine (F) will combine to form carbonyl fluoride according to the equation: $CO+F_2=COF_2$. Applicants have discovered upon bringing together the carbon monoxide and fluorine with the fluorine present in the proportion of more than one mole of fluorine to each mole of carbon monoxide under the conditions set forth herein, then the reaction takes place producing trifluoromethyl hypofluorite according to the equation of: $CO+2F_2=CF_3OF$. Let it be particularly noted that the large excess of fluorine to the carbon monoxide of the example is not necessary for the production of the trifluoromethyl hypofluorite but the fluorine preferably should be present slightly in excess of two moles per one mole of the carbon monoxide.

2. Streams of carbonyl fluoride ($COF_2$) and of fluorine, both diluted with nitrogen, were caused to mix in the reactor 20 in the presence of a catalyst 49 at about 170 degrees C. and the products were removed as described above. A high yield of trifluoromethyl hypofluorite was obtained.

3. One and one-third moles of ethanol ($C_2H_5OH$) vapor diluted with ten times its volume of nitrogen was caused to react with 12.3 moles of fluorine. The reactor with the so-called catalyst was used at a temperature of 175 degrees C. The process took place over a period of 43 hours. An extended period of time was employed to avoid undue rise of temperature in the reactor and thereby ignition of the equipment. Products of the reaction were trifluoromethyl hypofluorite, carbon tetrafluoride, hydrogen fluoride, and hexafluoroethane. Oxygen fluoride was also present, but it is not known whether it came from the reaction, since it may have been an impurity in the fluorine.

4. Tertiary butyl alcohol was fluorinated in the same manner as that used with ethanol. Among the products were trifluoromethyl hypofluorite, carbon tetrafluoride and octafluoropropane and decafluorobutane.

5. A 0.52 mole sample of ethylene glycol was fluorinated in the catalytic reaction vessel 20 using 6.5 moles of fluorine. The reaction took place over a period of 56 hours during which time the reactor was kept at about 175 degrees C. The reacting gases were diluted with nitrogen. Products of the reaction were carbon dioxide, carbonyl fluoride, hydrogen fluoride and trifluoromethyl hypofluorite. Approximately 0.8 mole of the latter was obtained.

6. Using the catalytic reaction vessel 20 at about 150 degrees C. a 0.55 mole sample of cyclohexanone was caused to react with an excess of fluorine in the presence of nitrogen acting as a diluent. Among the products were 1.5 liters of gaseous carbon tetrafluoride and 0.44 moles of trifluoromethyl hypofluorite. Much dodecafluoropentane was also obtained.

7. Formaldehyde may be fluorinated in the same manner as that used for carbon monoxide.

The fluorination by burning with fluorine of a compound having a molecular structure in which an oxygen atom is directly linked to a carbon atom was done in the apparatus as shown in Fig. 3. The carbon monoxide was introduced at the rate of about one liter per hour and the fluorine at the rate of about four liters per hour. These gases entered the reaction vessel 50 cold but as soon as the carbon monoxide came into contact with the fluorine, immediate reaction began and a flame 54 appeared at the end of the inlet tube 51, i. e., the carbon monoxide was caused to react in an atmosphere of fluorine.

The yield of the trifluoromethyl hypofluorite was about 96 percent of the theoretical amount obtainable from the carbon monoxide employed. No diluent inert gas was employed and no catalyst.

We now have discovered that the function of the catalyst is primarily to aid in controlling the rate of the reaction, dissipation of the heat liberated, and prevention of the production of objectionable by-products.

The trifluoromethyl hypofluorite produced by the methods herein set forth boils at about −94.2 degrees C. and is stable even above 450 degrees C. It is a strong oxidizing agent and has an odor similar to that of fluorine or oxygen fluoride ($OF_2$). It reacts with aqueous solutions of sodium hydroxide and with many other materials.

Care must be used in working with fluorine, and particularly with the substances set forth herein special care must be taken to avoid explosions. This may be accomplished by causing the reaction to take place in the presence of a porous mass as provided by the catalyst herein set forth, or by diluting the gases with inert gases, or by causing the reaction to take place rapidly as the substance or compound mixes with the fluorine as by burning.

We claim:

1. The process of producing the compound, trifluoromethyl hypofluorite, comprising directly reacting a compound having a molecular structure in which an oxygen atom is directly linked to a carbon atom, with fluorine, the latter being present for the reaction in an amount in excess stoichiometrically calculated as required for the production of carbonyl fluoride and the complete fluorination of the parts of the molecule not directly linked to oxygen.

2. The process of producing the compound, trifluoromethyl hypofluorite, comprising burning a compound having a molecular structure in which an oxygen atom is directly linked to a carbon atom, with fluorine, the latter being present for the reaction in an amount in excess stoichiometrically calculated as required for the production of carbonyl fluoride and the complete fluorination of the parts of the molecule not directly linked to oxygen.

3. The process of producing the compound, trifluoromethyl hypofluorite, comprising directly reacting by bringing together a current of a compound having a molecular structure in which an oxygen atom is directly linked to a carbon atom and a current of fluorine, the latter being present for the reaction in an amount in excess stoichiometrically calculated as required for the production of carbonyl fluoride and the complete fluorination of the parts of the molecule not directly linked to oxygen; and maintaining the rate of flow of said currents at a rate which prevents the heating of the reaction vessel to the ignition point of said vessel.

4. The process of producing the compound, trifluoromethyl hypofluorite, comprising burning a current of a compound having a molecular structure in which an oxygen atom is directly linked to a carbon atom and a current of fluorine, the latter being present for the reaction in an amount in excess stoichiometrically calculated as required for the production of carbonyl fluoride and the complete fluorination of the parts of the molecule not directly linked to oxygen; and maintaining the rate of flow of said currents at a rate which prevents the heating of the reaction vessel to the ignition point of said vessel.

5. The process of producing the compound, trifluoromethyl hypofluorite, comprising directly reacting a compound having a molecular structure in which an oxygen atom is directly linked to a carbon atom, the said compound being mixed with a diluent inert gas, with fluorine mixed with a diluent inert gas, the said fluorine being present for the reaction in an amount in excess stoichiometrically calculated as required for the production of carbonyl fluoride and the complete fluorination of the parts of the molecule not directly linked to oxygen.

6. The process of producing the compound, trifluoromethyl hypofluorite, comprising burning a compound having a molecular structure in which an oxygen atom is directly linked to a carbon atom, said compound being mixed with a diluent inert gas, with fluorine mixed with a diluent inert gas, the said fluorine being present for the reaction in an amount in excess stoichiometrically calculated as required for the production of carbonyl fluoride and the complete fluorination of the parts of the molecule not directly linked to oxygen.

7. The process of producing the compound, trifluoromethyl hypofluorite, comprising reacting carbon monoxide with fluorine, the latter being present for the reaction in the proportion of more than one mole per mole of the carbon monoxide.

8. The process of producing the compound, trifluoromethyl hypofluorite, comprising bringing together a current of carbon monoxide with a current of fluorine, the latter being present for the reaction in the proportion of more than one mole per mole of the carbon monoxide; and maintaining the rate of flow of said currents at a rate which prevents the heating of the reaction vessel to the ignition point of said vessel.

9. The process of producing the compound, trifluoromethyl hypofluorite, comprising bringing together a current of carbon monoxide with a current of fluorine, the latter being present for the reaction in the proportion of more than one mole per mole of the carbon monoxide in the presence of a catalyst of high heat conductivity.

10. The process of producing the compound, trifluoromethyl hypofluorite, comprising bringing together a current of carbon monoxide with a current of fluorine, the latter being present for the reaction in the proportion of more than one mole per mole of the carbon monoxide in the presence of a catalyst of high heat conductivity; and maintaining the rate of flow of said currents at a rate which prevents the heating of the reaction vessel to the ignition point of said vessel.

11. The process of producing the compound, trifluoromethyl hypofluorite, comprising bringing together a current of carbon monoxide with a current of fluorine, the latter being present for the reaction in the proportion of more than one mole per mole of the carbon monoxide in the presence of a catalyst of high heat conductivity at a temperature of 125 degrees to 300 degrees C.; and maintaining the rate of flow of said currents at a rate which prevents the heating of the reaction vessel to the ignition point of said vessel.

12. The process of producing the compound, trifluoromethyl hypofluorite, comprising reacting carbon monoxide mixed with a diluent inert gas with fluorine mixed with a diluent inert gas, the fluorine being present for the reaction in the proportion of more than one mole per mole of the carbon monoxide.

13. The process of producing the compound, trifluoromethyl hypofluorite, comprising bringing together a current of carbon monoxide mixed with a diluent inert gas with a current of fluorine mixed with a diluent inert gas, the fluorine being present for the reaction in the proportion of more than one mole per mole of the carbon monoxide in the presence of a catalyst of high heat conductivity; and maintaining the rate of flow of said currents at a rate which prevents the heating of the reaction vessel to the ignition point of said vessel.

14. The process of producing the compound, trifluoromethyl hypofluorite, comprising bringing together a current of carbon monoxide mixed with a diluent inert gas with a current of fluorine mixed with a diluent inert gas, the fluorine being present for the reaction in the proportion of more than one mole per mole of the carbon monoxide in the presence of a catalyst of high heat conductivity at a temperature of 125 degrees to 300 degrees C.; and maintaining the rate of flow of said currents at a rate which prevents the heating of the reaction vessel to the ignition point of said vessel.

15. The process of producing the compound, trifluoromethyl hypofluorite, comprising reacting carbonyl fluoride ($COF_2$) with fluorine.

16. The process of producing the compound, trifluoromethyl hypofluorite, comprising burning carbonyl fluoride ($COF_2$) with fluorine.

17. The process of producing the compound, trifluoromethyl hypofluorite, comprising bringing together a current of carbonyl fluoride with a current of fluorine; and maintaining the rate of flow of said currents at a rate which prevents the heating of the reaction vessel to the ignition point of said vessel.

18. The process of producing the compound, trifluoromethyl hypofluorite, comprising bringing together a current of carbonyl fluoride with a current of fluorine in the presence of a catalyst of high heat conductivity.

19. The process of producing the compound, trifluoromethyl hypofluorite, comprising bringing together a current of carbonyl fluoride with a current of fluorine in the presence of a catalyst of high heat conductivity; and maintaining the rate of flow of said currents at a rate which prevents the heating of the reaction vessel to the ignition point of said vessel.

20. The process of producing the compound, trifluoromethyl hypofluorite, comprising reacting carbonyl fluoride mixed with a diluent inert gas with fluorine mixed with a diluent inert gas.

21. The process of producing the compound, trifluoromethyl hypofluorite, comprising bringing together a current of carbonyl fluoride mixed with a diluent inert gas with a current of fluorine mixed with a diluent inert gas in the presence of a catalyst of high heat conductivity; and maintaining the rate of flow of said currents at a rate which prevents the heating of the reaction vessel to the ignition point of said vessel.

22. The process of producing the compound, trifluoromethyl hypofluorite, comprising bringing together a current of carbonyl fluoride mixed with a diluent inert gas with a current of fluorine mixed with a diluent inert gas in the presence of a catalyst of high heat conductivity at a temperature of 125 degrees to 300 degrees C.; and maintaining the rate of flow of said currents at a rate which prevents the heating of the reaction vessel to the ignition point of said vessel.

23. The process of producing the compound, trifluoromethyl hypofluorite, comprising reacting ethanol with fluorine, the latter being present for the reaction in the proportion of more than six moles per mole of ethanol.

24. The process of producing the compound, trifluoromethyl hypofluorite, comprising reacting ethylene glycol with fluorine, the latter being present for the reaction in a proportion of more than five moles per mole of ethylene glycol.

25. The process of producing the compound, trifluoromethyl hypofluorite, comprising reacting formaldehyde with fluorine, the latter being present for the reaction in a proportion of more than two moles of fluorine per mole of formaldehyde.

26. The process of producing the compound, trifluoromethyl hypofluorite, comprising burning a current of carbon monoxide with a current of fluorine, the latter being present for the reaction in the proportion of more than one mole per mole of the carbon monoxide.

References Cited in the file of this patent

UNITED STATES PATENTS

| Number | Name | Date |
|---|---|---|
| 2,013,035 | Daudt | Sept. 2, 1935 |
| 2,447,717 | Simons | Aug. 24, 1948 |

OTHER REFERENCES

Humiston et al.: J. Phys. Chem., vol. 23, pp. 572–7 (1919).

Fukuhara et al.: J. Am. Chem. Soc., vol. 63, pp. 788–791 (1941).

Kellogg et al.: Abstracts, New York Meeting, Am. Chem. Soc., page 24J (September 1947).

Miller et al.: J. Am. Chem. Soc., vol. 70, page 2602 (1948).